United States Patent [19]

Schlafer et al.

[11] 4,027,312

[45] May 31, 1977

[54] OPTICAL SCANNING APPARATUS AND METHOD FOR MANUFACTURING CATHODE RAY TUBES

[75] Inventors: John Schlafer, Wayland, Mass.; G. Norman Williams; Robert F. Wilson, both of Seneca Falls, N.Y.

[73] Assignees: GTE Laboratories Incorporated, Waltham, Mass.; GTE Sylvania Incorporated, Del.

[22] Filed: June 23, 1976

[21] Appl. No.: 699,110

[52] U.S. Cl. .................................... 354/1; 96/36.1

[51] Int. Cl.$^2$ ........................................ G03B 41/00

[58] Field of Search .................. 354/1, 4, 5; 350/6, 350/7, 285; 355/8, 20, 84; 96/36.1; 427/43, 53, 54, 68

[56] References Cited

UNITED STATES PATENTS 3,876,425 4/1975 Geenen et al. .................... 354/1 X

*Primary Examiner*—John Gonzales

*Attorney, Agent, or Firm*—Irving M. Kriegsman; Leslie J. Hart

[57] ABSTRACT

An optical scanning apparatus for manufacturing cathode ray tubes having a faceplate with an inner surface layer of photosensitive material and an adjacent apertured mask wherein a light beam from a light source is applied to a deflection device controlled by a control circuit to effect deflection of the light beam at an angle related to the angle of incidence of an electron beam in a cathode ray tube. The deflected light beam is imaged onto the inner surface of the faceplate of the cathode ray tube through the apertured mask, and a device is provided for scanning the deflected light beam over the surface of the faceplate in a predetermined pattern to effect exposure of the photosensitive material in the proper locations for registration with the landing location of an electron beam in the cathode ray tube. The size and shape of the effective area occupied by the light beam at the scanning device is controlled to effect proper selection of the size and shape of the exposed photosensitive material in relation to the associated aperture in the mask. Depending upon the desired shape and size of the exposed photosensitive material on the faceplate, the light beam area at the scanning device may be made to simulate a point, line or area source.

26 Claims, 11 Drawing Figures

OPTICAL SCANNING APPARATUS AND METHOD FOR MANUFACTURING CATHODE RAY TUBES

CROSS-REFERENCE TO OTHER APPLICATIONS

A concurrently filed application entitled "Optical Scanning Apparatus For Photolithography Of A Color Cathode Ray Tube Having An Aperture Mask" bears Ser. No. 699,109 and is filed in the name of John Schlafer. Also, a concurrently filed application entitled "Control System For An Optical Scanning Exposure System For Manufacturing Cathode Ray Tubes" bears Ser. No. 699,045 and is filed in the name of Thomas W. Schultz. Further, a concurrently filed application entitled "Overlap And Overscan Exposure Control System" bears Ser. No. 699,054 and is filed in the name of Mahlon B. Fisher and G. Norman Williams. Further, a concurrently filed patent applicaton entitled "Exposure Area Control For An Optical Scanning System For Manufacturing Cathode Ray Tubes" bears Ser. No. 699,046 and is filed in the name of Thomas W. Schultz. Lastly, a concurrently filed patent application entitled "Scanning Rate and Intensity Control For Optical Scanning Apparatus" bears Ser. No. 699,047 and is filed in the name of Thomas W. Schultz.

BACKGROUND OF THE INVENTION

The present invention relates to optical scanning apparatus and a method for manufacturing cathode ray tubes and, more particularly, to optical scanning apparatus in which the shape and size of exposed photosensitive material on the faceplate of a cathode ray tube may be accurately controlled.

The exposure of this photosensitive material provides a means for delineating the pattern of other material applied to the faceplate for generating, filtering or blocking light or for other functions. In a typical method, a phosphor is dusted onto the surface of the photosensitive material, after which the material is selectively exposed. Then, the unexposed photosensitive material is removed from the faceplate by well-known techniques. An important step in this method is the act of exposing the photosensitive material at the proper location on the faceplate.

Non-scanning methods for exposure of photosensitive material on the inner surface of a faceplate of a cathode ray tube are known. In one method, the photoresist, such as dichromated polyvinyl alcohol, is exposed by light from an ultraviolet light source, the light passing through an aperture mask registered with the faceplate. The ultraviolet source is a mercury arc lamp whose output is concentrated to pass through a small source aperture and then dispersed to fully illuminate the aperture mask. The proper intensity distribution, which is not necessarily uniform, across the aperture mask is obtained by controlling the intensity distribution at the source aperture and by the insertion of a graded neutral density filter between the source aperture and the aperture mask.

For proper registration of the phosphor pattern on the faceplate with the electron beam landings in the assembled tube, the light rays from the ultraviolet source during photoresist exposure should parallel the electron beam trajectories as they pass through the various apertures in the aperture mask. Due to aberrations in the magnetic deflection process, the apparent location of the electron beam source varies with the deflection angle. Thus, a fixed optical point source alone cannot simulate the deflected electron source over the entire faceplate. To introduce the necessary off-axis correction factors into the optical exposure system, a special aspheric lens is inserted into the system between the light source and aperture mask, with a separate lens being required for each of the three electron gun positions. The contour of each lens is designed such that the light source as seen through the lens from each point on the faceplate has the correct lateral location in the source plane to produce rays passing through the aperture mask with the same angle of incidence as an electron beam through the same aperture in an assembled tube. Design calculations for these lenses are difficult and costly, especially as maximum deflection angles become larger.

In most cases, when a tube design is modified by changing the maximum deflection angle, deflection yoke winding pattern or position, faceplate curvature, aperture mask spacing, or certain other parameters, a new lens set and graded neutral density filters are needed. Optimizing the new design may require a trial-and-error procedure which could involve the fabrication of additional lenses and filters.

Various scanning exposure systems are also known. In such a system, a small light beam is scanned over the aperture mask so as to expose the photosensitive material adjacent to the light-transmitting regions or apertures in the mask. For example, a scanning exposure system is described in the British Patent Specification No 1,257,933. In this patent, a scanned laser beam is used in conjunction with an aperture mask and photosensitive material for delineating phosphor patterns on faceplates for color CRTs. However, this patent does not provide for correction of the inherent discrepancy between elecetron beam landings and phosphor locations.

Another scanning exposure system is described in the U.S. Pat. to Geenen et al., No. 3,876,425. In this system, the effective light beam source is actually translated about a source plane to rovide correlation between phosphor locations and electron beam landing locations. Such beam translation eliminates the need for the aspheric lens which is necessary in the non-scanning exposure system. In the system described in the Geenen patent, the effective light beam source is the center of a mirror which deflects the beam toward the faceplate. An optical system always insures that the beam from the actual source is always directed to the center of the scanning mirror. The scanning mirror is carried by an assembly that rotates the mirror about two orthogonal axes to provide scanning and that translates the mirror along two orthogonal axes to provide movement of the center of the mirror in the source plane. The optical system includes a plurality of mirrors, bearing assemblies and a telescoping member.

This system has limitations which render it less than suitable for use in a production environment for cathode ray tubes. First, a scanning exposure system must have accurate optical alignment characteristics, i.e., the ability to repeatedly position the light beam at a predetermined point on the faceplate. The mechanical and optical system described is of such a complicated nature that it is doubtful that such alignment characteristics could be obtained. More specifically, the large number of rotating parts and simultaneously rotating and translating parts of the system could result in misalignment with continued use as is necessary in a production environment. Furthermore, the feature of actually translating the effective light beam source in a plane adds complexity to the electronic system which is necessary to control the scanning and mirror translation functions. More specifically, each time the mirror is translated, the beam, if not corrected by the scanning function, would impinge upon other than the desired faceplate location. Thus, the translating and scanning functions are interdependent.

SUMMARY OF THE INVENTION

An object of the present invention is to enhance the capabilities of an optical scanning exposure system for manufacturing cathode ray tubes. Another object of the invention is to improve control of the light beam utilized in an optical scanning exposure system for manufacturing cathode ray tubes. Still another object of the invention is to improve the control of exposure time of photosensitive material on the faceplate of a cathode ray tube by an optical scanning exposure system.

These and other objects, advantages and capabilities are achieved in one aspect of the invention by optical scanning apparatus for use in manufacturing cathode ray tubes having a layer of photosensitive material on the inner surface of a faceplate adjacent an apertured mask wherein a light beam from a light source is applied to a deflection means controlled by a control circuit to effect deflection of the light beam at an angle related to the angle of incidence by an electron beam, imaged at the faceplate of the cathode ray tube, and scanned by a scanning means across the apertured mask and faceplate of the cathode ray tube in a predetermined pattern. Accordingly, the effective area of the light beam at the scanning location is controlled to effect control of the size and shape of the exposed photosensitive material in relation to an associated aperture in the mask.

DESCRIPTION OF PREFERRED EMBODIMENTS

Figure 1:
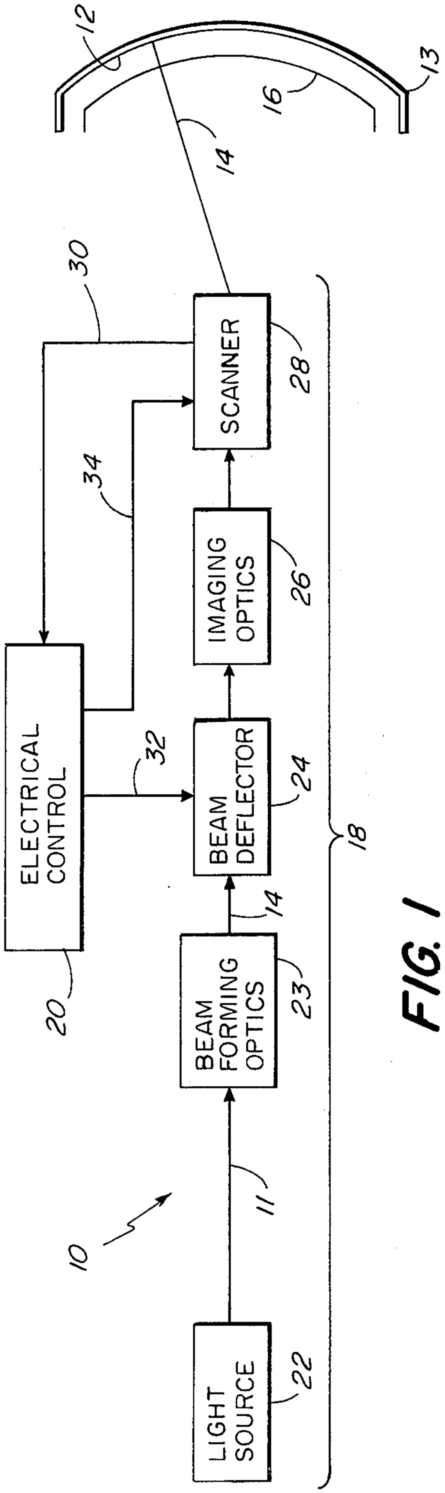
FIG. 1 is a block diagram of an optical scanning exposure system including optical scanning apparatus according to the invention and an electrical control for the apparatus.

In an exemplary embodiment of the present invention, as illustrated in block diagram form in FIG. 1, an optical scanning exposure system, represented generally be the reference numeral 10, is utilized in the manufacture of color cathode ray tubes. The exposure system 10 exposes a layer of photosensitive material (not shown) on an inner surface 12 of a faceplate 13 for a cathode ray tube. The exposure is accomplished by scanning a light beam 14 over an array of light-transmitting apertures, in a mask 16 disposed adjacent to the faceplate. The exposure system 10 includes an optical scanning apparatus, represented generally by the reference numeral 18, and an electrical control system 20. The apparatus 18 includes the necessary mechanical and optical components which perform the actual scanning of the beam 14 on the faceplate 13, while the electrical control system 20 generates the command signals for the apparatus 18. The optical scanning apparatus 18 includes a light source 22, beam forming optics 23, a beam deflector 24, an imaging optics assembly 26, and a scanner 28. The light source 22 emits light 11 which has a wavelength spectrum which exposes the photosensitive material. Preferably, the light source 22 is a laser light source. In the exemplary embodiment, the laser is an argon-ion laser. The beam forming optics 23 modifies light 11 from the source 22 to obtain the proper beam 14 diameter and divergence angle at the aperture mask 16. The beam deflector 24 is positioned in the path of the light beam and deflects the light beam through an angle which is related to a predetermined angle of incidence that an electron beam has at each point on the aperture mask as its passes through the transparent regions of the mask in an operating tube. The imaging optics 26 receives the deflected light beam 14 and images the point of deflection of the light beam substantially onto the faceplate 13. In this manner, the light beam 14 may be made to impinge on the mask with the same angle of incidence as the electron beam in an operating tube. By this arrangement, the proper angle of incidence is obtained substantially without translation of the light beam at the faceplate. The deflected light beam is scanned over the aperture mask in a predetermined fashion to expose the photosensitive material adjacent to all light-transmitting regions on the mask. The scanner 28 and the beam deflector 25 operate in synchronism via the electrical control 20 so that the light beam has the proper angle of incidence for each light-transmitting region on the mask. Before initiation of an exposure sequence, the electrical control 20 is provided with, and stores, predetermined information on the deflection which must be applied to the beam 14 to obtain the proper angle of incidence for each position on the aperture mask. Beam position information 30 fed from the scanner to the electrical control causes signals 32, generated from this stored information, to be applied to the beam deflector 24 in the correct sequence. This scan position information is also used by the electrical control in generating the scan signals 34.

Figure 2:
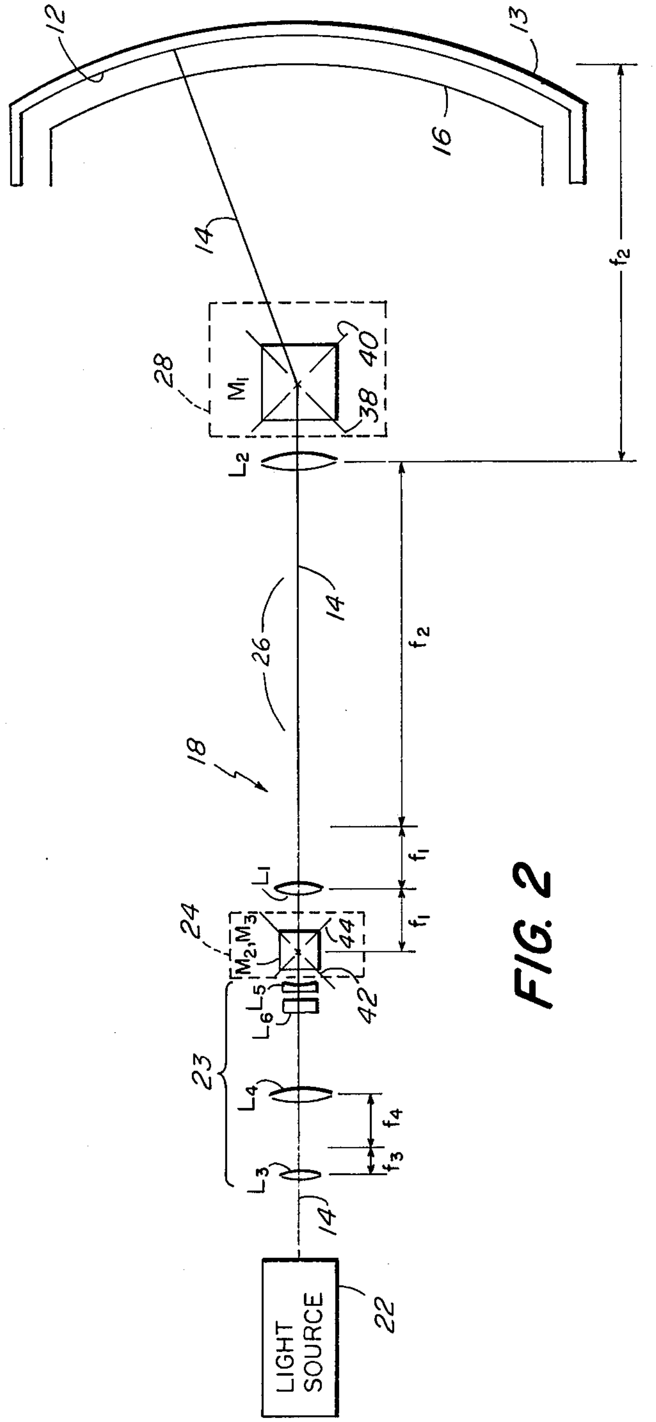
FIG. 2 is a diagram illustrating the various optical components of an embodiment of the optical scanning apparatus.

Referring now to FIG. 2, there is illustrated in detail a preferred embodiment of the various optical components comprising the optical scanning apparatus 18 shown in FIG. 1. The scanner 28 comprises a light-scanning surface, such as a mirror M1, which is rotatable about first and second scanning axes 38 and 40, which are orthogonal with respect to each other. The beam deflector 24 comprises a pair of rotatable mirrors M2 and M3. Each mirror is rotatable about one of a pair of orthogonal axes 42 and 44. While the beam deflector is shown as being a pair of mirrors, it is to be understood that the invention should not be limited since any combination of beam deflecting elements may be used so long as the required function is obtained. The imaging optics 26 includes first and second optical focusing elements L1 and L2 in the path of the deflected light beam 14. The focusing elements L1 and L2 are separated by a distance measured along the beam path equal to the sum of the focal lengths $f_1$ and $f_2$, respectively, of the focusing elements L1 and L2. Also, the first focusing element L1 is separated from the beam deflector 24 by a distance measured along the beam path equal to the focal length of $f_1$ of the first focusing element L1. The second focusing element L2 is separated from the faceplate by a distance measured along the beam path substantially equal to the focal length $f_2$ of the second focusing element L2. In the example of FIG. 2, both focusing elements L1 and L2 are double-convex converging lenses. However, it is to be understood that any combination of focusing elements, such as mirrors with either concave or convex surfaces or lenses with either concave or convex surfaces may be used so long as such combination of focusing elements images the deflected light beam onto the vicinity of the faceplate 13. Also, as illustrated in FIG. 2, $f_2$ is greater than $f_1$ to provide magnification of the cross-sectional area of the light beam. Preferably, the beam area at the mask is greater than the size of the apertures, thereby to simultaneously direct light through a plurality of apertures.

The optical scanning apparatus 18 may, although not necessary, include additional structural features which may advantageously be utilized. For example, it may be desirable that the beam from the light source 22 be well collimated or that its diameter be modified before entering the remainder of the optical system. In the preferred embodiments, the light source is a laser light source and to improve collimation of the beam or to change its diameter, it may be desirable to insert a telecentric lens system, such as lenses L3 and L4, in the path of the light beam 14 immediately as it leaves the light source 22. These lenses L3 and L4 are separated by substantially a distance equal to the sum of their focal lengths, $f_3$ and $f_4$, respectively; in the exemplary embodiment, the lenses are double-convex, converging lenses but it is to be understood that other combinations of focusing elements could also be used. For the reasons to be described subsequently, a diverging lens L5 may be inserted into the path of the light beam 14 at a location to the left of the beam deflector 24. Also, it may be desirable with certain types of aperture masks, such as the slot aperture type, to obtain more beam divergence in one axis than in its orthogonal axis. This feature may be obtained by placing a lens L6 in the path of the light beam, the lens L6 being a cylindrical or toroidal diverging lens.

Figure 3:
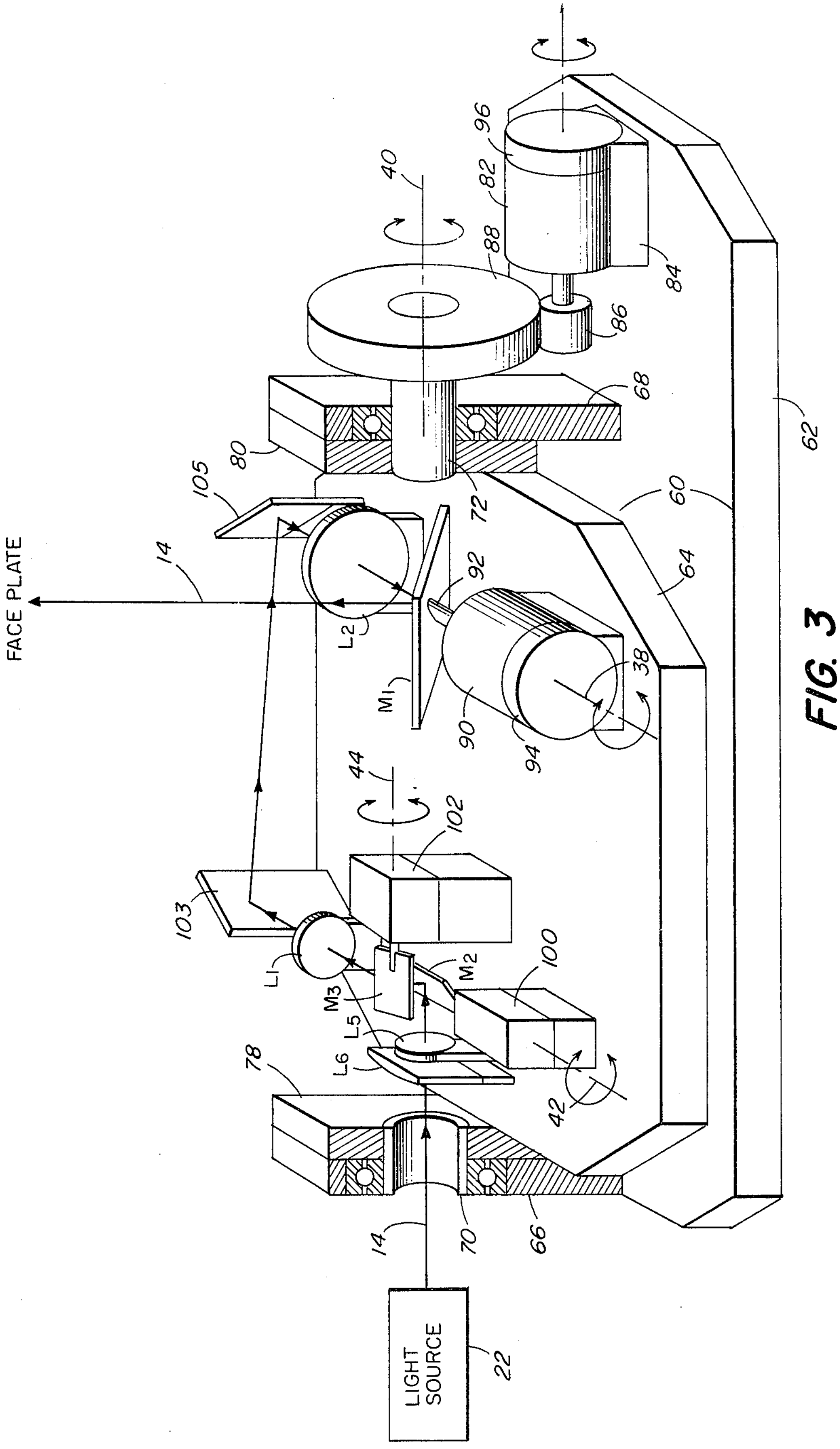
FIG. 3 is a perspective view of an illustrative embodiment of an optical scanning apparatus including both optical and mechanical components according to the present invention.

FIG. 3 is an illustrative embodiment of the combination of mechanical and optical components which comprise the optical scanning apparatus 18 previously mentioned with reference to FIGS. 1 and 2. The purpose of the mechanical components is to provide the means for implementing the rotating capability of the scanner 28 and the beam deflector 24. The scanner 28 includes the mirror M1 for steering the light beam 14 from the imaging optics 26 through a sequence of angles defined with respect to two intersecting scan axes 38 and 40, these axes being orthogonal with respect to each other. With respect to scanning about scan axis 40, the scanner includes a cradle assembly, represented by the reference numeral 60, having a base 62 and a component support platform 64 rotatably coupled to the base 62 and a drive assembly for rotating the support platform 64 with respect to the base 62. The scan axis 40 is the axis of rotation of the cradle assembly 60. In order that the beam position on the mirror M1, and thus the origin of scanning action in the scanner 28, remain invariant with respect to rotation about scan axis 40, it is important that the light beam 14 be coaxial with the scan axis 40 as the beam enters the cradle assembly. In rotatably coupling the support platform 64 to the base 62, a pair of cradle support flanges 66 and 68 are rigidly affixed to the base 62 on opposite sides of the platform 64. Flanges 66 and 68 have shafts 70 and 72, respectively, rotatably mounted thereon. The shaft 70 is formed with a central aperture, permitting the beam 14 to enter the cradle 60 along its axis. The shaft 70 is rigidly affixed to a support flange 78 which, in turn, is rigidly affixed to one side of the platform 64. Likewise, a support flange 80 is rigidly affixed to the other side of the platform 64 and to the shaft 72. The drive assembly for rotating the support platform 64 about the scan axis 40 includes a motor 82 affixed at 84 to the base 62 and a speed reduction mechanism, illustrated here as a gear train, comprising gears 86 and 88, coupling the output of the motor 82 to the shaft 72. One advantage of the speed reduction mechanism is in reducing the inertia load on the motor. This load is caused by the necessity of rotating not only the platform 64, but also all the components which are mounted on the platform. The speed reduction mechanism also allows finer control of the platform by the motor.

The type of motor 82 which is employed depends upon the nature of the scanning sequence. In the exemplary embodiment, the scanning sequence is similar to that of an electron beam in an operating cathode ray tube displaying an NTSC-type television signal. In both situations, the sequence comprises a vertically descending series of horizontal scan lines. The difference is that the electron beam scan is interlaced and is unidirectional from left to right as viewed from the outer surface of the faceplate, whereas the light beam scan is not interlaced and is bidirectional. In this type of light beam scan sequence, the line scan velocity is greater than the average scan velocity orthogonal to the lines, i.e., the frame scan velocity. Accordingly, the scan axis 40 of the cradle controls the frame scanning, and it has been found to be advantageous to use a stepper motor for the motor 82. Thus, a raster is generated as the line scanner, described below, sweeps the laser light beam back and forth across the aperture mask in a zig-zag motion, and the frame scan cradle steps down some fraction of a line at the end of each line. Other types of scan patterns may be utilized; for example, the pattern may be spiral and in such a case, a continuous motion motor, such as a dc servo motor, may be more desirable for the motor 82.

As previously stated, the scanner 28 includes a device for steering the light beam from the imaging optics 26 through a sequence of angles about the line scan axis 38. In FIG. 3, this device includes the mirror M1 and a motor 90 whose output shaft 92 is rigidly affixed to the mirror M1. Preferably, the motor 90 is a dc servo motor. There are several features of the mirror M1. First, the intersection point of the scan axes 38 and 40 is at the mirror reflecting surface so that the origin of scan for both axes is coincident. Further, the reflecting planar surface of the mirror M1 is at an angle of 45° with respect to the scan axis 38.

The dc servo motor 90 and the stepper motor include angular shaft encoders 94 and 96, respectively, for providing a scan position signal which is sent to the electrical control 20 via the line 30 as previously shown in FIG. 1. Also, each motor receives a command signal from the electrical control 20; these signals are shown as being carried over the line 34 in FIG. 1.

The beam deflector 24 in FIGS. 1 and 2 is shown on FIG. 3 as mirrors M2 and M3 and their associated rotational drive mechanisms 100 and 102. The rotational axis 42 and 44 of the mirrors M2 and M3, respectively, are orthogonal and closely spaced to bring the origin of beam deflection for each axis in near coincidence. This feature of bringing the origin of beam deflection in near coincidence could also be accomplished without actually physically mounting the mirrors close to one another. For example, if desirable, the mirrors could be spaced apart and a focusing element, such as a lens, could be used to focus one mirror deflection point onto the other mirror. The mirrors M2 and M3 are rotated by galvanometer-type motors 100 and 102, respectively; these galvanometers, as is well known, provide an angular rotation of the output shaft proportional to a current input. The galvanometers in the example should provide an output shaft rotation in the range of ±15°.

Figure 4A:
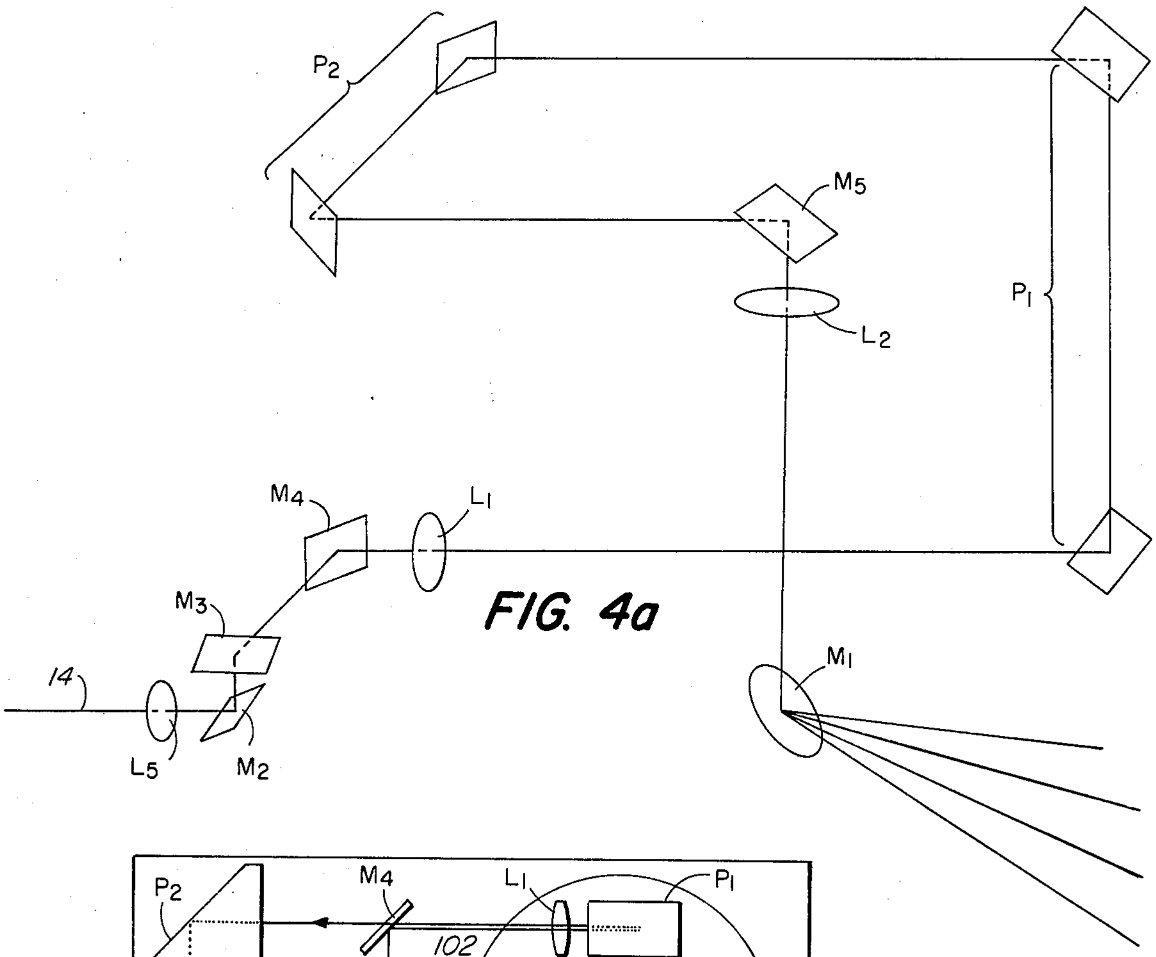
FIG. 4*a* is a perspective view of the optical path in a preferred embodiment of an optical scanning apparatus according to the invention.
Figure 4B:
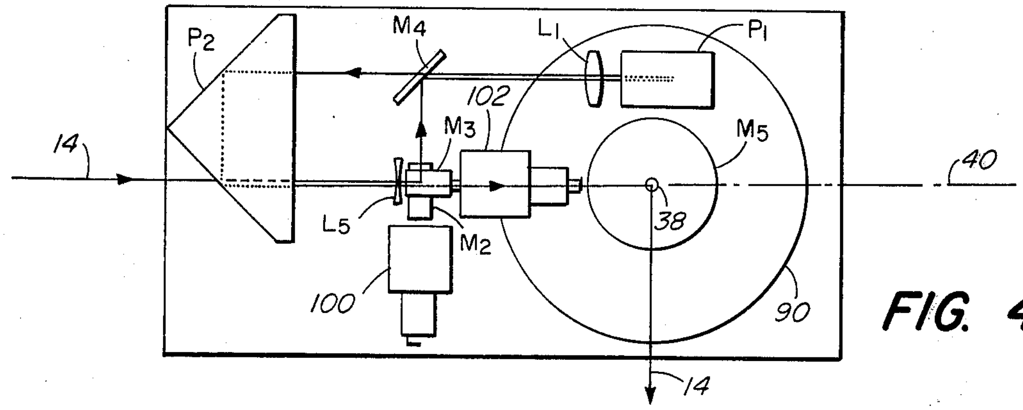
FIG. 4*b* is a plan view of the embodiment shown in FIG. 4*a* showing the disposition of mechanical components.
Figure 4C:
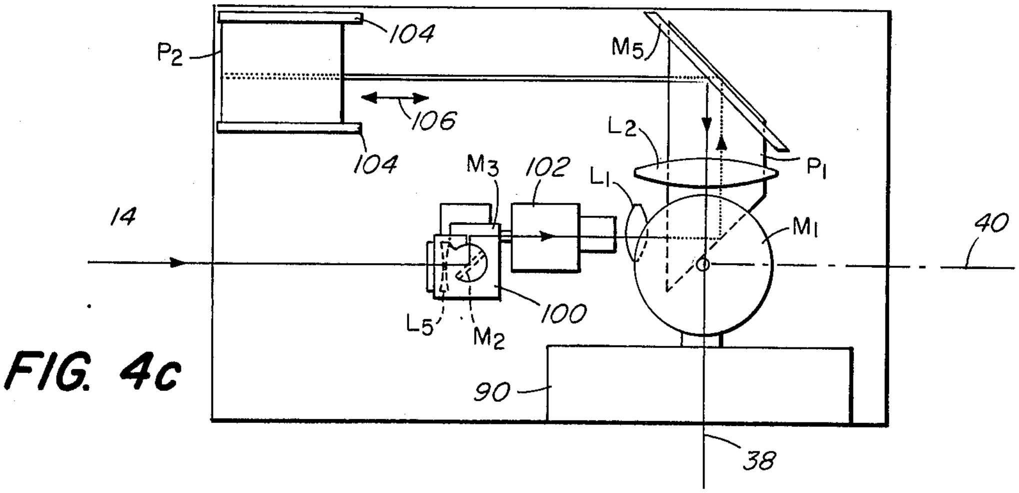
FIG. 4*c* is a side elevational view of the embodiment shown in FIG. 4*a* showing the disposition of mechanical components.

While many arrangements of the basic optical components of the scanning apparatus 18 are possible within the spirit and scope of the invention, a particularly compact and convenient embodiment is shown in FIGS. 4*a*, 4*b* and 4*c*, representing perspective, top and side views, respectively. In this embodiment, the light path is folded by mirrors M4 and M5 and right angle prisms P1 and P2. An advantage of prisms for folding the optical path is that beam deviation is produced by total internal reflection at the glass-air interface rather than from a specially coated surface, as in standard mirrors. Reflection efficiency can be nearly 100% and is not subject to deterioration as readily as standard mirror surfaces.

As can be observed, the light beam passes through or is reflected from the following components in sequence:

diverging lens L5
rotatable deflection mirror M2
rotatable deflection mirror M3
fixed mirror M4 (90° deviation)
focusing lens L1
prism P1
prism P2
fixed mirror M5
focusing lens L2
scan mirror M1

This embodiment may be easily adapted to use with faceplates for different size cathode ray tubes by changing the focal length of lens L2 and re-establishing the distance between lens L1 and lens L2 at $f_1$ plus $f_2$ by moving prism P2 along a track assembly 104 in the direction of arrow 106. The focal length $f_2$ of lens L2 is chosen such that the center of rotation of the scan mirror M1 is located in a position with respect to the faceplate substantially equivalent to the position of the origin of electron beam deflection in an operating CRT when the faceplate is at a distance substantially $f_2$ from lens L2.

The details of the electrical control 20, shown in FIG. 1, do not comprise a part of the present invention. As stated previously, the function of the control is to generate the scan control signals while at the same time to supply the proper current valves to the galvanometers at each scan position. This function can be obtained by numerous types of apparatus depending upon the degree of automation desired. In an unautomated case, the control for each galvanometr may merely be a variable current source, and the control for the scanning motors may be a suitable, indexable electrical power source. In operation, the scan motors are indexed to the proper scan position, and then the motors are stopped; for each position, the variable current sources are adjusted for the proper values. Then, the laser is turned on and after exposure, the laser is turned off. This operation is repeated in sequence until the faceplate is exposed. For more automated operation, a properly programmed, general purpose computer may be used as the electrical control. The computer stores the angle of incidence adjustments (i.e., the values of current for each scan position) in a memory and outputs the proper current values and scan position signals.

One of two techniques may be used for establishing the proper angle of incidence adjustments for each scan position. The first is an empirical process requiring the exposure of a sample faceplate by another system such as that utilizing the aspheric lens and graded neutral density filter. The exposed sample faceplate is then mounted into position in the scanning apparatus of the present invention. The scanning mirrors are then indexed to the various scan positions, and at each scan position, the proper amount of current is applied to the galvanometers so that the light beam landing is coincident with the exposed material. These current values comprise the angle of incidence adjustments for processing other faceplates of the same type as the sample. In another method, it is possible to derive an equation relating the current to the galvanometers to the scan mirror angular position. The equation relating current to scan mirror angle is a function of the geometry of the optical scanning apparatus 18 and of a set of data which defines the effective position ($X_p$, $Y_p$) of the electron beam in a deflection plane for each faceplate location (X, Y, Z). This equation may be implemented by a suitable programmed, general purpose computer or by a special purpose computer forming the electrical control 20.

Preferably, the electrical control 20 is implemented in the manner described in the concurrently filed patent application entitled "Control System For An Optical Scanning Exposure System For Manufacturing Cathode Ray Tubes" bearing Ser. No. 699,047 and being filed in the name of Thomas W. Schultz. In this control system, there is provided a memory storage device for storing information representative of the proper angle of incidence of a light beam at a matrix of positional locations on the faceplate of the cathode ray tube and of the rate of scan of the light beam from one positional location to the next. The encoder provides horizontal and vertical light beam scan position information to the storage device. A scan rate device, responsive to the scan rate and position information in the memory storage provides signals for controlling the rate of light beam scanning. Further, an angle of incidence control device, responsive to angle of incidence and position information from the memory storage, provides electrical signals for the galvanometers which control the angle of incidence deflecting mirrors.

In the development of an optical scanning apparatus it is important that the apparatus have the versatility to process various types of cathode ray tubes. To obtain this versatility necessitates accurate control of the shape and size of the exposed photosensitive material in relation to the shape and size of the apertures in the mask. With some cathode ray tubes, it is desirable to make the area of the exposed photosensitive material smaller than the area of the associated aperature in the mask. With other types of tubes, it may be desirable to make the area of the exposed photosensitive material larger than the area of the associated apertures or larger in only one dimension of the area of the associated aperture. A slotted aperture mask type of cathode ray tube is an example of the latter example. Such a tube has a mask formed with a plurality of slots, rather than circular apertures, having a longer dimension normal to the line horizontal scan of an electron beam. The phosphor associated with the slots on the faceplate, and thus the exposed photosensitive material, should exist under the opaque regions of the mask which separate adjacent vertically oriented slots.

According to the present invention, means such as the beam forming optics 23 in FIGS. 1 and 2 are provided for controlling the effective area occupied by the light beam at the scanner 28 to effect control of the size and shape of the exposed area of photosensitive material in relation to the associated aperture in the mask. In one feature of the invention, the area of the light beam may be made to simulate a point source at the scanning mirror M1 of the scanner 28 by proper focusing of the collimated light beam. This may be accomplished by proper beam divergence with the diverging lens L5 in FIGS. 2, 3 and 4, located intermediate the light source 22 and the beam deflector 24. By proper selection of the location and focal length of lens L5, the collimated beam can be made to have a focal point at the mirror M1. This feature causes all rays from the light beam to pass through the apertures at the same angle as the beam is scanned across the aperture to avoid motion of the shadowed mask aperture on the faceplate. As a result, the shape and size of exposed regions of photosensitive material conform to the shape and size of their associated apertures for all apertures included within the area of the scanned light beam at the mask. Beam focusing schemes other than the one of diverging lens L5 may be utilized to obtain the same functional result.

In another feature of the invention, the area of the light beam at the scanning mirror M1 is made to have a controlled, finite size and shape. This feature in conjunction with proper establishment of the level of exposure, such as by control of beam intensity or scan speed, provides control over the size and shape of the regions of exposed photosensitive material in relation to the size and shape of the associated apertures. This feature may be more fully understood with reference to FIGS. 5 and 6 of the drawings.

Figure 5:
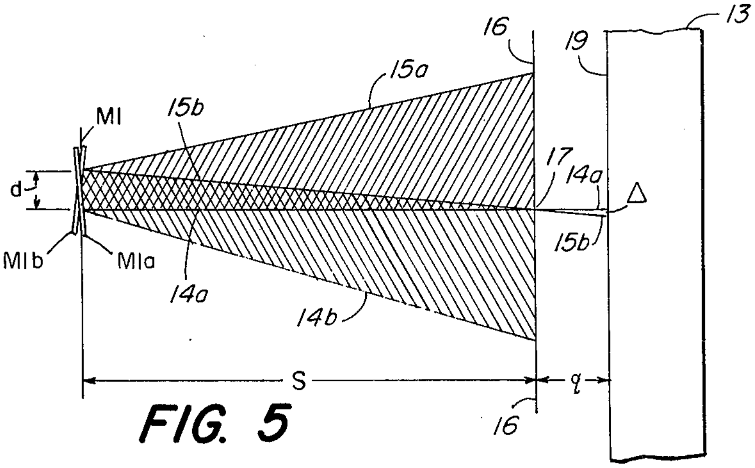
FIG. 5 is a diagram illustrating the effect of the beam area at the scanner upon the area of the exposed photosensitive material.

In FIG. 5, the light bam from a laser source is reflected from the scan miror M1 and impinges on the aperture mask 16. A portion of the light beam passes through an aperture 17 which is circular with a radius $r_o$ in the mask 16 to project a shadow of the mask on a photosensitive coating 19 on the faceplate 13 behind the mask. The scanning mirror M1 rotates on an axis through its surface causing the light beam spot to translate across the mask 16. In this analysis, the beam is assumed to have a uniform spherical phase front with a diameter ($d$) at the scanning mirror M1. The light beam is assumed to have a Gaussian intensity distribution, and ($d$) is defined as the diameter at which the intensity has fallen off to $1/e^2$ of its central maximum value. At position $M1_a$ of the mirror M1, the beam has an uppermost extreme ray 15*a* and a lowermost extreme ray 14*a*. The lowermost extreme ray 14*a* of the beam passes through the center of the mask aperture 17. At the position $M1_b$ of the scanning mirror M1, the beam has an uppermost extreme ray 15*b* and a lowermost extreme ray 14*b*. The uppermost extreme ray 15*b* and a lowermost extreme ray 14*b*. The uppermost extreme ray 15*b* passes through the center of the aperture 17. At their intersection with the faceplate 12, these rays 14*a* and 15*b* are separated by a distance Δ. This distance Δ represents the amount of movement of the projected mask aperture on the faceplate as the beam is scanned over the aperture. This distance Δ has been found to be related to the distance ($d$) by the mirror to mask separation ($s$) and the mask to faceplate spacing ($q$) by the following relationship:

$$\Delta = (q/s)d$$

Thus it may be seen that the distance Δ is independent of the beam diameter at the aperture mask or the degree of divergence or convergence of the beam. For given values of $q$ and $s$, Δ is directly related to the diameter of the beam at the scanning mirror and is ideally zero only for a point source of light located at the scanning mirror.

Figure 6:
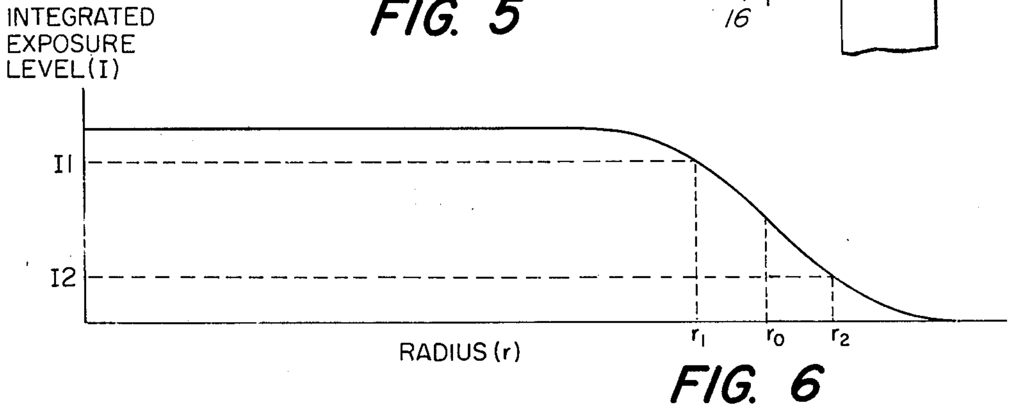
FIG. 6 is a graph of an exposure profile for the photosensitive material exposed in the manner of FIG. 5.

As shown in FIG. 6, when Δ is a finite value and the beam has a Gaussian intensity distribution, the photosensitive material exposure profile is a smeared version of the aperture shape due to the movement of the shadowed image. In this analysis, it is assumed that the aperture dimension is small compared with the beam spot diameter at the mask and that the effects of diffraction and scattering in the photoresist may be neglected. FIG. 6 is a graph of an exposure profile with the vertical axis representing the integrated exposure level and the horizontal axis representing the radius of a circular area of photoresist. The exposure level is seen to remain constant and then to taper off gradually at the edge passing through half maximum at a width $r_o$ equal to the aperture width. From widths $r_1$ to $r_o$, the profile is less than maximum and more than half of maximum and from widths $r_2$ to $r_o$, the profile is less than half maximum and greater than zero. By control of the exposure level by proper selection of light beam intensity or speed of scan as is described in a concurrently filed patent application entitled "Scanning Rate And Intensity Control For Optical Scanning Apparatus", bearing Ser. No. 699,047 and being filed in the name of Thomas W. Schultz, there is provided control over the size of the area of exposed photosensitive material which is developed to an image. For example, if the exposure level for obtaining complete exposure of photoresist is set at I1, the area of the exposed photosensitive material is less than the area of its associated aperture. On the other hand, if the exposure level for obtaining complete exposure of photoresist is set at I2, the area of the exposed photosensitive material is greater than the area of its associated aperture.

The means for producing an area source of defined size and shape at the scanning mirror M1 includes proper focusing through the use of the lens L5 in FIG. 2 or through proper selection of the lenses L1 and L2 in FIG. 2 to magnify the area of the light beam. Thus, by proper selection of the lens L5, the light beam may be focused to simulate either a point or a preselected area source at the scanning mirror M1.

Figure 7:
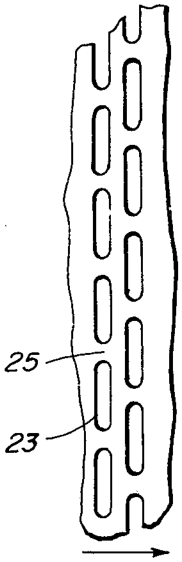
FIG. 7 is a diagram of a portion of a slot aperture mask.

In another feature of the invention, the control of the size and shape of the light beam at the scanning mirror M1 includes the capability of focusing the light beam to simulate a line source. This feature is useful with a slotted aperture mask type of cathode ray tube shown in FIG. 7, which is a diagram showing the arrangement of columns of slotted apertures 23. The arrow represents the direction of line scanning of an electron beam in an operating tube. Thus, the longer dimension of the slots 23 is normal to the line scan direction. In such a tube, the phosphor is a vertical line across the faceplate and thus to obtain a continuous vertical line of exposed photosensitive material using this type of aperture mask, the light beam must expose photosensitive material adjacent to opaque regions 25 separating the ends of the adjacent slots along the longer dimensions. The lens L6 in FIG. 2 may be used to carry out focusing the light beam to simulate a line source at the scanning mirror M1. The lens L6 may be a cylindrical or a toroidal lens. In this case, the light beam scanning is preferably along the longer dimension of the slots 23 which is perpendicular to the scanning direction of the electron beam in an operating tube.

In another feature, the effective area of the light beam at the scanning mirror may be greater than the actual area of the light beam. If the beam is focused by the lens L5 to simulate a point source at the scanning mirror M1, $\Delta$ will be zero. By using an optical scheme such as illustrated in FIG. 2, the beam deflector 24 may be used to cause the beam to deflect through small angles about axes located at the faceplate or an aperture mask independent of the scan pattern generated by the scan mirror M1 and independent of the angle of incidence corrections. This scheme is described in a concurrently filed patent application entitled "Exposure Area Control For An Optical Scanning System For Manufacturing Cathode Ray Tubes" bearing Ser. No. 699,046 and being filed in the name of Thomas W. Schultz. Deflection about axes at the faceplate does not displace the beam but causes movement of the projected mask aperture on the faceplate proportion to the degree of deflection. The displacement of the projected aperture $\Delta$ can be related to the deflection $\theta$ at the aperture mask by $\Delta = q \tan \theta$. The deflection also causes movment of the point source at the scan mirror. A deflection resulting in movement of distance $d$ at the scan mirror M1 corresponds to a displacement of the aperture projection of:

$$\Delta = (q/s)\, d$$

This relationship is identical to that obtained for an aperture scan by a beam of source size $d$ at the scan mirror. This type of deflection may be used to smear the aperture projections on the faceplate to modify the developed image as discussed previously. This method is advantageous in that the projection may be smeared along any axis in the plane of the faceplate independent of the scan direction. This allows the image dimensions to be modified uniformly, or anisotropically, if desired.

Figure 8:
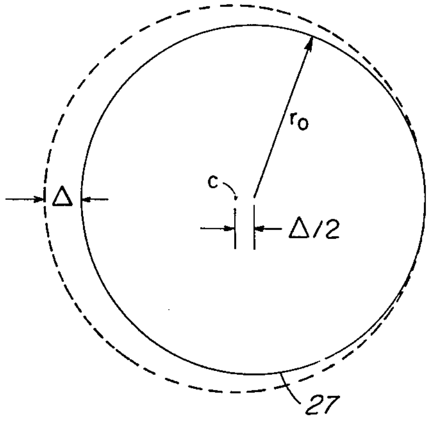
FIG. 8 is a diagram of an alternative technique for controlling the area of exposed photosensitive material.
Figure 9:
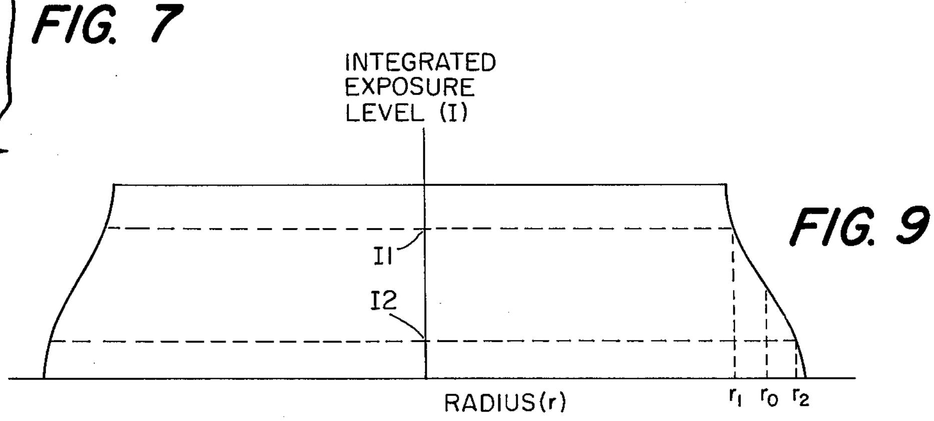
FIG. 9 is a graph of an exposure profile in accordance with the technique of FIG. 8.

The exposure profile in FIG. 9 has been determined for a circular aperture 27 of radius ($r_o$) in FIG. 8, in which deflection has been used to steer the image in a circular orbit (using sinusoidal quadrature-phase deflection signals) about the nominal undisturbed image axis ($c$). The orbital velocity is such that a number of revolutions, such as 4 or more, are completed in the time required for the beam to scan across a one spot diameter at the mask.

In FIG. 9, the exposure profile is circularly symmetric about the undisturbed image axis and exhibits two well-defined edges on transition points. One is at a radius $r_1$, smaller than the aperture radius $r_o$ and the other at a radius $r_2$, larger than the aperture radius $r_o$. The steepness of the exposure curve at these two radii relaxes the degree of exposure control required to obtain reproducible, developed circular images with radii smaller than or larger than the aperture in a manner similar to that described previously for FIG. 7. By making the two orthogonal deflection axes unequal, an elliptical pattern may be generated to create or correct for elliptical developed images due to non-circular apertures, non-normal incidence of the beam or other causes.

The embodiments of the present invention are intended to be merely exemplary and those skilled in the art shall be able to make numerous variations and modifications of them without departing from the spirit and scope of the present invention. All such variations and modifications are intended to be within the scope of the present invention as defined by the appended claims.

We claim:

1. An optical scanning apparatus for manufacturing cathode ray tubes having a layer of photosensitive material disposed on the faceplate inner surface and exposed by scanning a light beam over an adjacent apertured mask wherein the optical scanning apparatus includes a light source providing a light beam of a wavelength which exposes the photosensitive material, means disposed in the path of the light beam for deflecting the light beam at an angle related to an angle of incidence of an electron beam in a cathode ray tube, means for imaging the deflected light beam at the faceplate of the cathode ray tube, and means for scanning the deflected light beam over the apertured mask in a predetermined fashion to expose the photosensitive material adjacent the apertures of the mask, the improvement comprising means for controlling the effective area occupied by the light beam at the scanning means to effect control of the size and shape of the exposed area of photosensitive material in relation to an associated aperture in the mask.

2. The improvement according to claim 1 wherein said control means includes means for focusing the light beam to simulate a point source located at the scanning means to cause all rays from the light beam to pass through the aperture at the same angle as the beam is scanned across the aperture to avoid motion of the shadowed mask aperture on the faceplate.

3. The improvement of claim 2 wherein said focusing means includes divergence means disposed in the light beam path intermediate to the light source and the means for deflecting the light beam at an angle related to an angle of incidence of an electron beam in a cathode ray tube.

4. The improvement according to claim 1 wherein the control means includes means producing a finite cross-sectional area at the scanning means to produce a photosensitive material exposure profile which tapers off gradually at the edge in such a manner having a half maximum at a width equal to that of the aperture, less than maximum and more than half maximum for a range of widths less than the aperture width and less than half maximum and greater than zero for a range of widths greater than the aperture width, and means for establishing the exposure level to control the size of the area of exposed photosensitive material which is developed to an image.

5. The improvement according to claim 4 wherein the establishing means includes means for establishing the exposure level to produce an area of photosensitive material of adequate exposure to produce an image which is less than the area of the associated aperture.

6. The improvement according to claim 4 wherein the level establishing means includes means for establishing the exposure level to produce an area of photosensitive material of adequate exposure to produce an image which is greater than the area of the associated aperture.

7. The improvement according to claim 4 wherein the means for producing a finite cross-sectional area includes means for focusing the light beam to simulate an area source located at the scanning means.

8. The improvement according to claim 7 wherein the focusing means includes divergence means disposed in the light beam path.

9. The improvement according to claim 4 wherein the means for producing a finite cross-sectional area includes means for magnifying the cross-sectional area of the light beam at the mask with respect to the cross-sectional area of the beam at the deflecting means.

10. The improvement according to claim 1 wherein said apertures of said mask are formed in the shape of slots having a longer dimension normal to the line of horizontal scan of an electron beam in an operating cathode ray tube and wherein the means for controlling the area includes means for focusing the light beam to simulate a line source to cause exposure of photosensitive material under opaque regions of the mask separating the ends of the adjacent slots along the longer dimension.

11. The improvement according to claim 10 wherein the scanning means includes means for scanning the line source along the longer dimension of the slots in the apertures in the mask.

12. The improvement according to claim 10 wherein the focusing means includes means, positioned in the path of the light beam intermediate the light source and the means for deflecting the light beam, for diverging the light beam with respect to one dimension of its area.

13. The improvement according to claim 12 wherein the divergence means includes a cylindrical lens.

14. The improvement according to claim 12 wherein the divergence means is a toroidal lens.

15. In a method for manufacturing cathode ray tubes having a layer of photosensitive material disposed on the inner surface of a faceplate and exposed by scanning a light beam over an adjacent apertured mask wherein the method includes the steps of generating a light beam having a wavelength spectrum which exposes the photosensitive material, deflecting the light beam through an angle related to the angle of incidence of an electron beam at a point on the apertured mask, imaging the deflected light beam at the faceplate of the cathode ray tube, and scanning the deflected light beam in a predetermined pattern over the apertured mask, the improvement comprising the step of controlling the effective size and shape of the light beam at the location in the path where the beam is scanned to effect control of the size and shape of the area of exposed photosensitive material in relation to an associated aperture in the mask.

16. The improved method according to claim 15 wherein the step of controlling the size and shape of the light beam includes the step of focusing the light beam to simulate a point source located in the scanning means to cause all rays from the light beam to pass through the aperture at the same angle as the beam is scanned across the aperture to avoid motion of the shadowed mask aperture on the faceplate.

17. The improved method according to claim 16 wherein the step of focusing further includes diverging the light beam.

18. The improved method according to claim 15 wherein the step of controlling the size and shape includes the steps of producing a finite cross-sectional area at the location in the path where the beam is scanned to produce a photosensitive material exposure profile which tapers off gradually at the edge in such a manner having a half maximum at a width equal to that of the aperture, less than maximum and more than half maximum for a range of widths less than the aperture width, and less than half maximum and greater than zero for a range of widths greater than the aperture width and establishing the exposure level to control the size and shape of the area of exposed photosensitive material which is developed to an image.

19. The improved method according to claim 18 wherein the step of establishing the exposure level includes the step of establishing the exposure level to produce an area of photosensitive material of adequate exposure to produce an image which is less than the area of associated aperture.

20. The improved method according to claim 18 wherein the step of establishing the exposure level includes the step of establishing the exposure level to produce an area of photosensitive material of adequate exposure to produce an image which is greater than the area of the associated aperture.

21. The improved method according to claim 18 wherein the step of producing a finite cross-sectional area includes the step of focusing the light beam to simulate an area source located in the path of the light beam where the beam is scanned.

22. The improved method according to claim 21 wherein the step of focusing includes the step of diverging the light beam.

23. The improved method according to claim 18 wherein the step of producing a finite cross-sectional area includes the step of magnifying the cross-sectional area of the light beam.

24. The improved method according to claim 15 wherein the apertures of the mask are formed in the shape of slots having a longer dimension normal to the line of horizontal scan of an electron beam in an operating cathode ray tube and wherein the step of controlling the size and shape of the scan location includes the step of focusing the light beam to simulate a line source to cause exposure of photosensitive material under opaque regions of the mask separating the ends of the adjacent slots along the longer dimension.

25. The improved method according to claim 24 wherein the step of scanning the light beam includes the step of scanning the line source along the longer dimension of the slots in the aperture in the mask.

26. The improved method according to claim 24 wherein the step of focusing the light beam includes the step of diverging the light beam with respect to one dimension of its area.

* * * * *

UNITED STATES PATENT OFFICE

CERTIFICATE OF CORRECTION

Patent No. 4,027,312 Dated May 31, 1977

Inventor(s) John Schlafer et al.

It is certified that error appears in the above-identified patent and that said Letters Patent are hereby corrected as shown below:

Column 8, line 16, "galvanometr" should read -- galvanometer --.

Column 10, line 1, "bam" should read -- beam --.

Column 10, line 2, "miror" should read -- mirror --.

Signed and Sealed this

*twenty-third* Day of *August 1977*

[SEAL]

*Attest:*

RUTH C. MASON
*Attesting Officer*

C. MARSHALL DANN
*Commissioner of Patents and Trademarks*